(12) United States Patent
Aoki et al.

(10) Patent No.: US 7,679,318 B2
(45) Date of Patent: Mar. 16, 2010

(54) BATTERY DEVICE (75) Inventors: Hisashi Aoki, Aichi (JP); Hiroaki Sato, Kanagawa (JP); Yoichi Miyajima, Tokyo (JP); Toshio Takeshita, Kanagawa (JP)

(73) Assignee: Sony Corporation, Tokyo (JP)

( * ) Notice: Subject to any disclaimer, the term of this patent is extended or adjusted under 35 U.S.C. 154(b) by 154 days.

(21) Appl. No.: 10/555,321

(22) PCT Filed: Mar. 25, 2005

(86) PCT No.: PCT/JP2005/006436
§ 371 (c)(1),
(2), (4) Date: Nov. 3, 2005

(87) PCT Pub. No.: WO2005/096413
PCT Pub. Date: Oct. 13, 2005

(65) Prior Publication Data
US 2006/0281002 A1 Dec. 14, 2006

(30) Foreign Application Priority Data
Mar. 31, 2004 (JP) .............................. 2004-102323

(51) Int. Cl.
H02J 7/00 (2006.01)

(52) U.S. Cl. ................... 320/112; 320/107; 320/113; D13/107

(58) Field of Classification Search ................. 320/114, 320/112, 106, 107, 110, 111, 113; 429/97, 429/98, 99; D13/103, 107; 439/500
See application file for complete search history.

(56) References Cited

U.S. PATENT DOCUMENTS 3,138,080 A * 6/1964 Jacobson ................ 396/388
4,636,703 A * 1/1987 Tohya et al. ............. 320/110
4,645,995 A * 2/1987 Terrell et al. ............. 320/110
4,666,278 A * 5/1987 Uematsu et al. ......... 396/539
4,816,735 A * 3/1989 Cook et al. .............. 320/110
5,148,094 A * 9/1992 Parks et al. ............... 320/110
5,164,761 A * 11/1992 Isono et al. .............. 396/279
5,187,422 A * 2/1993 Izenbaard et al. ........ 320/110

(Continued)

FOREIGN PATENT DOCUMENTS

EP  1 524 710 A2  4/2005

(Continued)

Primary Examiner—Edward Tso
Assistant Examiner—M'Baye Diao
(74) Attorney, Agent, or Firm—Oblon, Spivak, McClelland, Maier & Neustadt, L.L.P.

(57) ABSTRACT

Battery side terminals disposed on the first and second battery devices are arranged at the same places at front surfaces with respect to lower surfaces and side surfaces. On the front surface of a case of the second battery device, there are formed engaging recessed parts. Positions close to the lower surface of the engaging recessed parts are formed as flat surfaces parallel to a upper surface and the lower surface. The dimensions from the lower surface of the case to flat surfaces and the dimension from the lower surface of the case of the first battery device to an upper surface are configured to be the same. Accordingly, it is possible to provide an advantageous battery device that allows the use of battery devices having various capacities and improves the ease of use.

22 Claims, 8 Drawing Sheets

U.S. PATENT DOCUMENTS

| | | | |
|---|---|---|---|
| 5,317,247 A * | 5/1994 | Chong et al. | 320/112 |
| 5,391,972 A * | 2/1995 | Gardner et al. | 320/115 |
| 5,543,702 A * | 8/1996 | Pfeiffer | 320/110 |
| 5,726,551 A * | 3/1998 | Miyazaki et al. | 320/124 |
| 5,909,102 A | 6/1999 | Stone, III et al. | |
| 6,172,867 B1 * | 1/2001 | Satou et al. | 361/679.06 |
| 6,265,845 B1 * | 7/2001 | Bo et al. | 320/113 |
| 6,495,988 B1 * | 12/2002 | Liao | 320/111 |
| 6,583,600 B2 * | 6/2003 | Haga et al. | 320/110 |
| 6,774,605 B2 * | 8/2004 | Usui et al. | 320/112 |
| 6,982,541 B2 * | 1/2006 | Zick et al. | 320/114 |
| D535,941 S * | 1/2007 | Miyashita | D13/107 |
| 2002/0086647 A1 | 7/2002 | Ilvonen | |
| 2004/0239292 A1 * | 12/2004 | Lie | 320/112 |
| 2005/0200331 A1 * | 9/2005 | Patino et al. | 320/128 |

FOREIGN PATENT DOCUMENTS

| | | |
|---|---|---|
| JP | 002158/1987 | 1/1987 |
| JP | 5-144477 | 6/1993 |
| JP | 6-14469 | 1/1994 |
| JP | 8-106925 | 4/1996 |
| JP | 9-320642 | 12/1997 |
| JP | 11-329387 | 11/1999 |
| JP | 2000-223094 | 8/2000 |
| WO | WO 03/003485 | 1/2003 |

* cited by examiner

BATTERY DEVICE

TECHNICAL FIELD

The present invention relates to a battery device.

BACKGROUND ART

In past, there has been commercially available a battery device equipped with; a case formed in a rectangular shape having a width in a left-to-right direction, a thickness in an up-and-down direction, and a length in a front to rear direction, with an upper surface anal a lower surface opposite thereto in the up-and-down direction, and a front surface and a rear surface opposite thereto in the length direction; a charging unit disposed inside the case; and a battery side terminal connected to the charging unit and disposed on the front surface of the case (for example, see Japanese Patent Application Publication No. 2002-110121).

Further, electronic devices having a battery housing chamber for accommodating the battery device is also available.

This type of battery housing chamber is structured with a width corresponding to the width of the battery device, a height corresponding to the case thickness, a depth corresponding to the case length, and a housing side chamber terminal to be in contact with the battery side terminal when the battery device is aligned with chamber and inserted therein.

DISCLOSURE OF THE INVENTION

However, in the above-mentioned battery device, since the height of the battery housing chamber is formed to allow fitting of battery with a certain thickness, two types of battery devices having different thicknesses cannot be housed.

Consequently, for example, it is difficult to use battery devices of different capacities for different uses or purposes. There is a need for improvement in ease of use.

The present invention has been made in view of such circumstances. An object of the present invention is to provide a battery device capable of accommodating battery devices having different capacities, and that is advantageous in improving the ease of use.

In order to achieve the above-mentioned object, a battery device according to the present invention is a battery device that is a first or a second battery devices and housed in a single battery housing chamber of an electronic device, characterized in that each of the first and second battery device includes: a case having side surfaces located on both ends of a width direction, an upper surface and lower surface located on both ends of a thickness direction, and a front surface and a rear surface located on both ends of a length direction; a charging unit disposed inside the case; and a battery side terminal disposed on the front surface of the case and connected to the charging unit. The case of the first battery device and the case of the second battery device have a substantially same width and length while the case of the second battery device is formed with thickness larger than the case of the first battery device. The battery side terminal disposed on the first battery device and the battery side terminal disposed on the second battery device are located at a same position on the respective front surfaces with respect to the lower surfaces and the side surfaces. An engaging recessed part is formed on the front surface of the case of the second battery device. A dimension from the lower surface of the case of the second battery device to a position close to the lower surface on a wall of the case where the engaging recessed part is formed and a dimension from the lower surface to the upper surface of the case of the first battery device are arranged to be a same.

BEST MODES FOR CARRYING OUT THE INVENTION

By providing an engaging recessed part formed on the front surface in one type of battery device having larger thickness, the object of providing an advantageous battery device, which allows the use of battery devices having various capacities and improvement in ease of use, is achieved.

Next, an embodiment 1 of the present invention will be described with reference to the drawings.

Figure 1A:
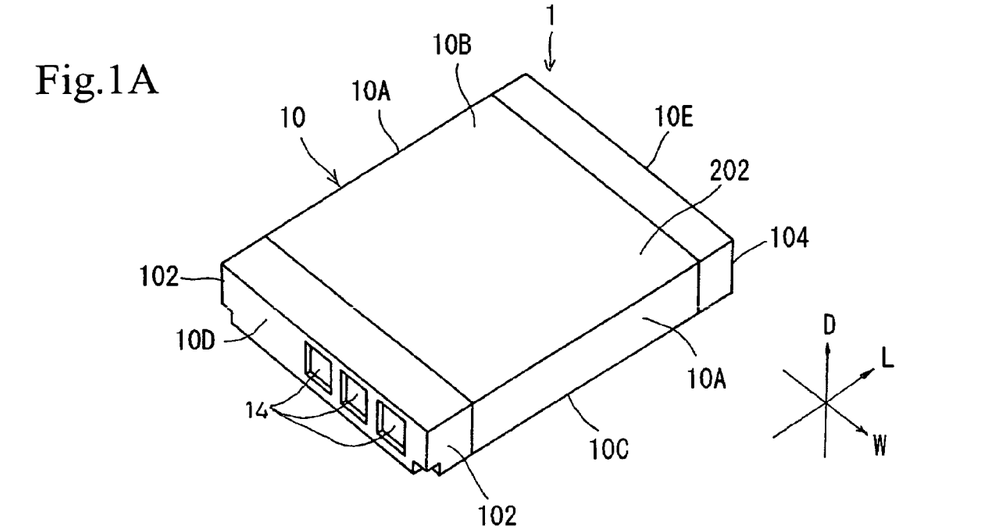
FIG. 1A and FIG. 1B are perspective views of a first and a second battery device of an embodiment 1.
Figure 1B:
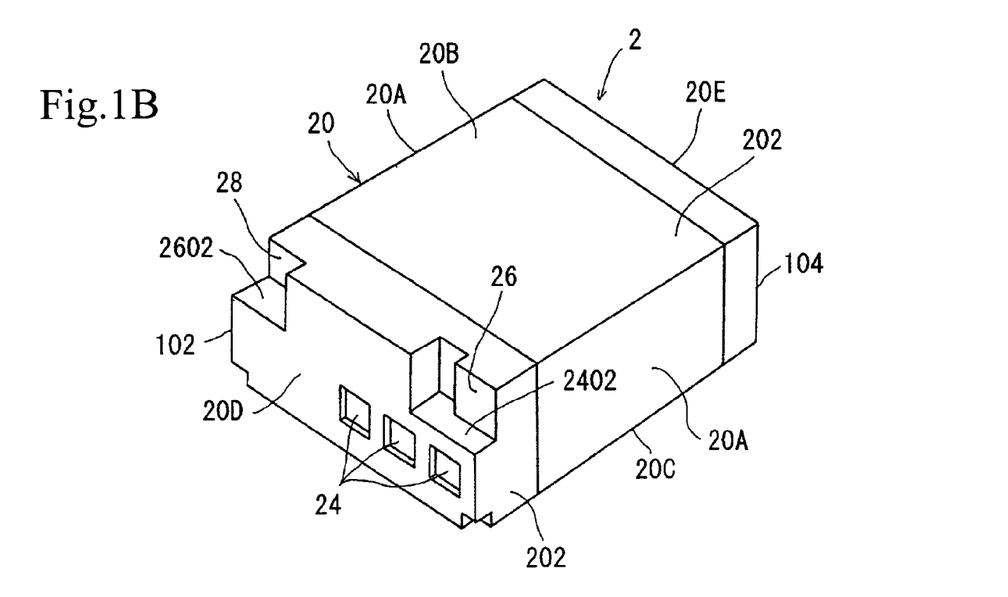
Figure 2A:
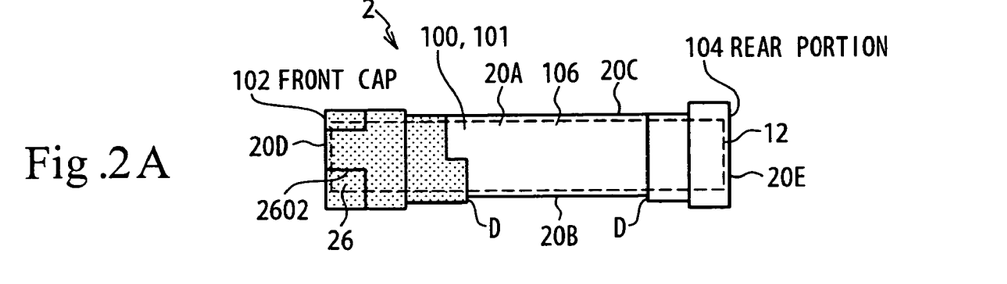
FIG. 2A to FIG. 2C are explanatory diagrams of a battery device.
Figure 2B:
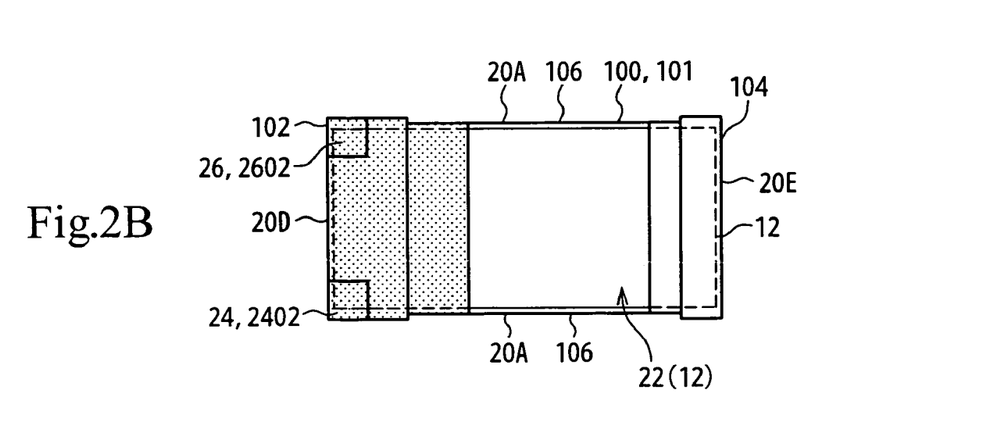
Figure 2C:
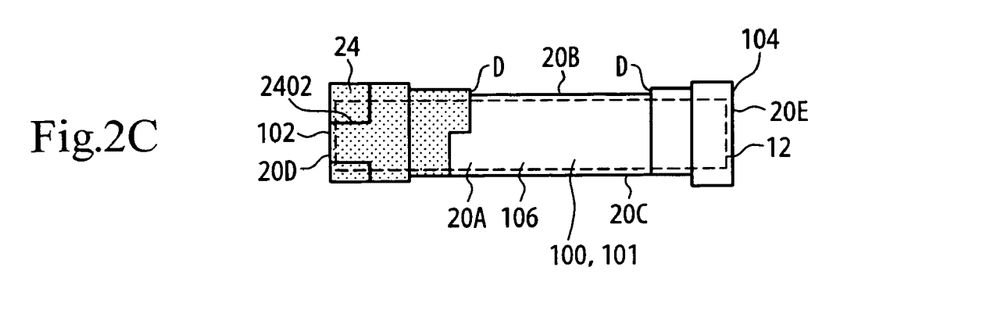
Figure 3A:
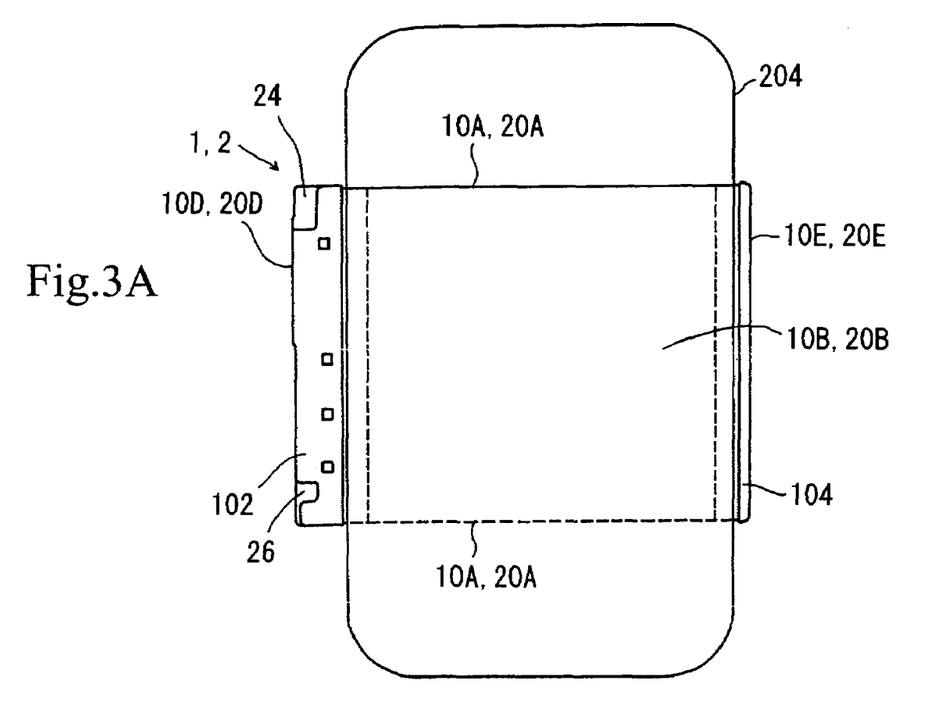
FIG. 3A and FIG. 3B are explanatory diagrams of a film to be attached to a battery device.
Figure 3B:
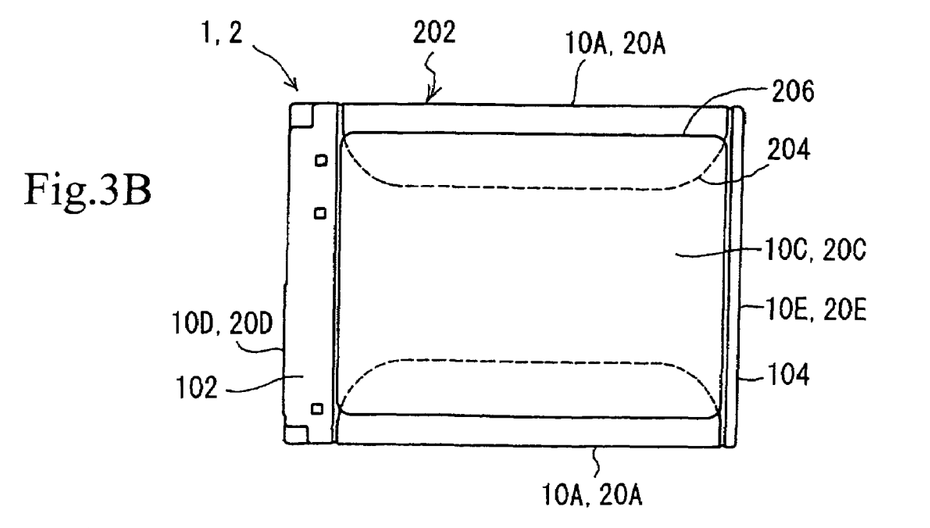
Figure 4:
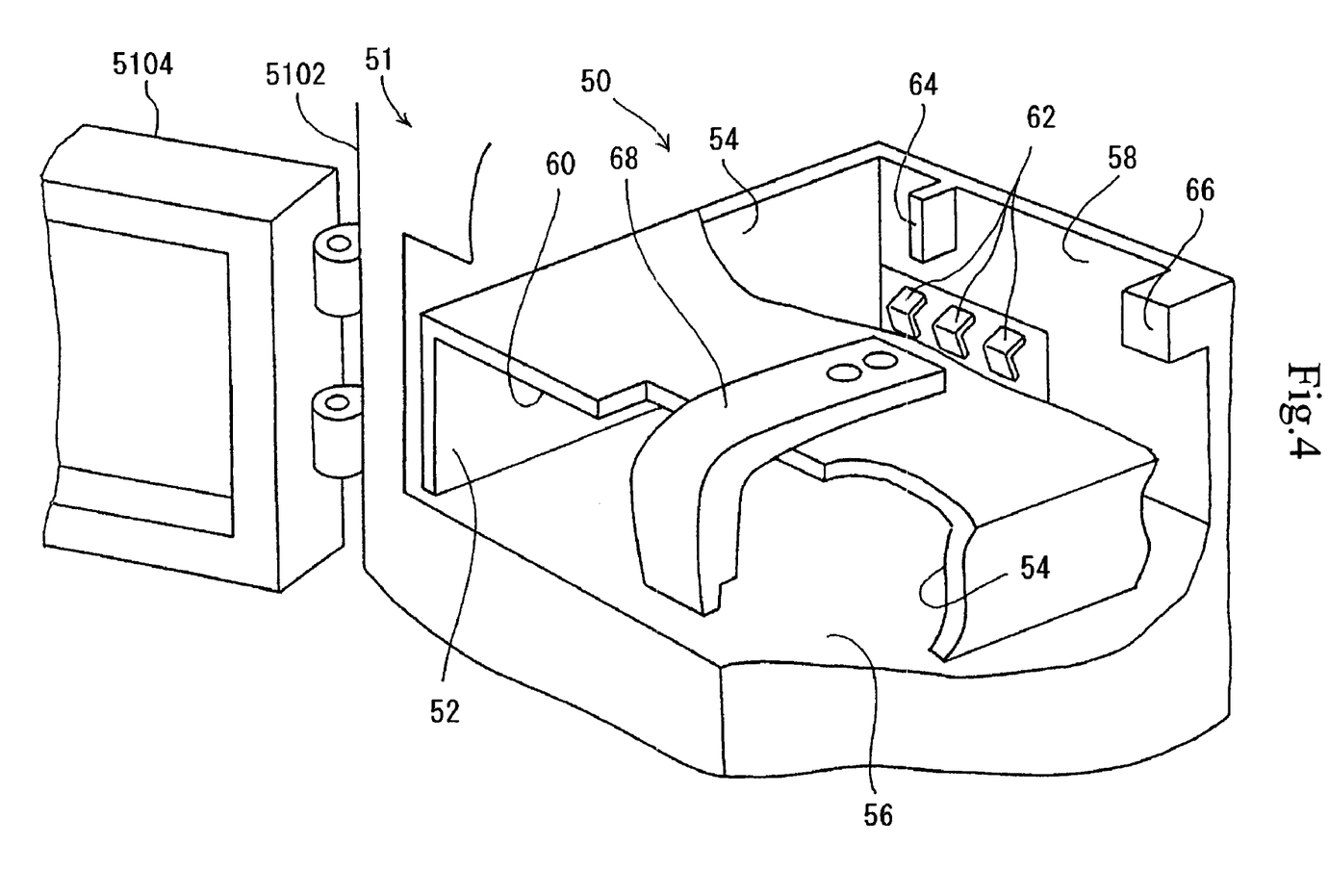
FIG. 4 is a perspective view showing a broken-out structure of a part of a battery housing chamber of an electronic device.
Figure 5A:
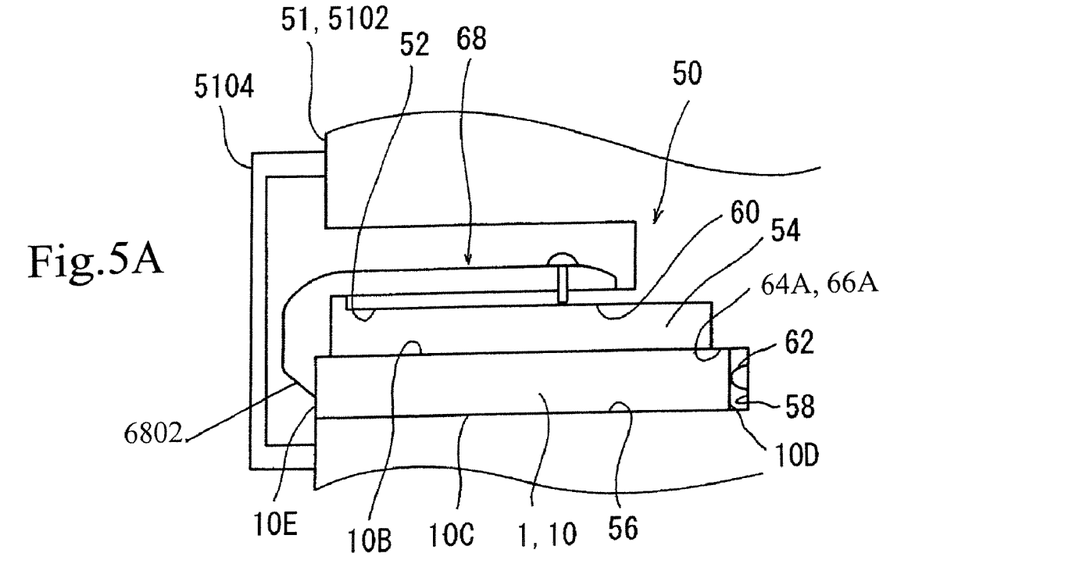
FIG. 5A and FIG. 5B are explanatory diagrams showing a condition of the first and second battery devices being housed in the battery housing chamber.
Figure 5B:
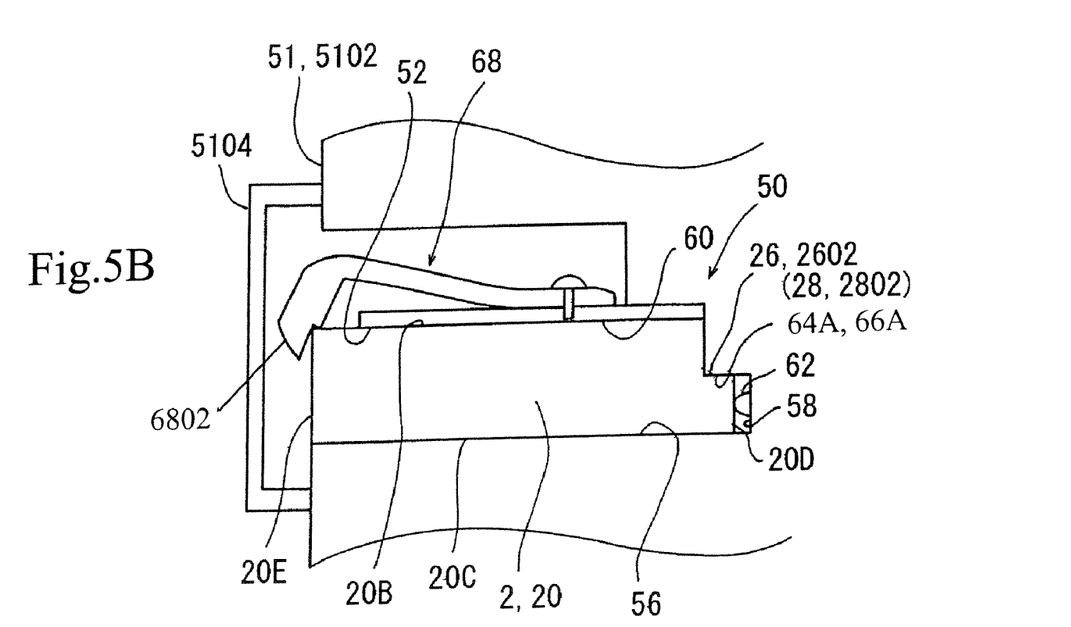

FIG. 1A and FIG. 1B show perspective views of the first and second battery devices; FIG. 2A to FIG. 2C shows explanatory diagrams of battery devices; FIG. 3A and FIG. 3B show explanatory diagrams of films attached to the battery devices; FIG. 4 shows a perspective view of a partially broken-out portion to show construction of a battery housing chamber of an electronic device; and FIG. 5A and FIG. 5B show explanatory diagrams in which the first and the second battery device are housed in a battery housing chamber.

In the present embodiment, two types of battery devices having different thicknesses, which are the first battery device 1 and the second battery device 2 shown in FIG. 1A and FIG. 1B, are selectively housed in a single battery housing chamber 50 shown in FIG. 4.

First, description will be made about the battery devices.

As shown in FIG. 1A, the first battery device 1 includes a case 10, a charging unit 12 (FIG. 2B) disposed inside the case 10, and a battery side terminal 14 disposed in the case 10.

As shown in FIG. 1B, the second battery device 2 includes a case 20, a charging unit 22 (FIG. 2B) disposed inside the case 20, and a battery side terminal 24 disposed on the case 20.

In the present embodiment, the cases 10 and 20 have side surfaces 10A and 20A located on both ends of a width direction W, upper surfaces 10B and 20B and lower surfaces 10C and 20C located on both ends of a thickness direction D, and front surfaces 10D and 20D and rear surfaces 10E and 20E located on both ends of a length direction L.

The case 10 of the first battery device 1 and the case 20 of the second battery device 2 have the same or substantially the same width and length, with the thickness of the case 20 of the second battery device being formed larger than the thickness of the case 10 of the first battery device 1.

The battery side terminals 14 and 24 disposed on the first and the second battery devices 1, 2 are located at the same places at these front surfaces 10D and 20D with respect to lower surfaces 10C and 20C and side surfaces 10A and 20A, and are connected to a charging unit 22, respectively.

FIG. 2A to FIG. 2C show a left side view, a plan view, and a right side view of the case 20 of the second battery device 2.

In reference to these FIG. 2A to FIG. 2C, schematic construction of the case 10 of the first battery device 1 will be described, together with the case 20 of the second battery device 2.

The cases 10 and 20 respectively have a frame 100, the frame 100 including a quadrilateral frame-like member 101 and a front cap 102 fitted on a front portion of the frame-like member 101.

Further, the front surfaces 10D and 20D are formed with a front surface of the front cap 102, while rear surfaces 10E and 20E are formed with a rear surface of a rear portion 104 of the frame-like member 101.

Further, a side wall 106 of the frame-like member 101 is exposed between the front cap 102 and the rear part 104, and the charging unit 12 is attached to the front cap 102 and housed in a space formed by these front cap 102, rear portion 104, and two side walls 106.

Further, between part close to the front surface 10D or 20D and part close to the rear surface 10E or 20E of the cases 10, 20, as shown in FIG. 1A and FIG. 1B, a film 202 is wrapped around the entire circumference of the front cap 102, the rear part 104, and two side walls 106 and attached thereon.

More specifically, the film 202 has insulating property, including an upper film 204 and a lower film 206.

As shown in FIG. 3A and FIG. 3B, first, the upper film 204 is adhered to cover the charging unit 12 part exposed upward and the side walls 106, between the front cap part 103 and the rear part 104, and further, adhered to parts in both sides of a lower surface of the charging unit 12. Next, the lower film 206 is adhered to cover a part of the upper film 204, which is adhered to parts in both sides of the lower surface of the charging unit 12 (22), and the lower surface part of the charging unit 12 (22) exposed downward between the front cap 102 and the rear part 104.

In this manner, the cases 10 and 20 of the first battery device 1 and the second battery device 2 having different sizes and shapes are respectively formed with the frame 100 and the film 202.

On the front surface 20D of the case 20 of the second battery device 2, there are formed engaging recessed parts 26 and 28 with a spacing in the width direction W.

One engaging recessed part 26 is formed so as to open on the other side surface 20A of two side surfaces 20A and the front surface 20D as well as the upper surface 20B.

The other engaging recessed part 28 is formed so as to open on the other side surface 20A of two side surfaces 20A and the front surface 20D as well as the upper surface 20B.

Positions close to the lower surface 20C on a wall of the front cap 202 forming each of the engaging recessed parts 26 and 28 are formed as flat surfaces 2402 and 2602 parallel to the upper surface 20B and the lower surface 20C.

The dimensions from the lower surface of the case 20 to flat surfaces 2402 and 2602 and the dimension from the lower surface 10C of the case 10 of the first battery device 1 to the upper surface 10B are configured to be the same.

Next, a battery housing chamber of an electronic device will be described.

As shown in FIG. 4, a battery housing chamber 50 is provided in a casing 5102 of an electronic device 51.

The battery housing chamber 50 has an insert/take-out opening 52 on the rear surface of the casing 5102, and this insert/take-out opening 52 is opened and closed by an opening/closing cover 5104.

The battery housing chamber 50 includes a side wall 54 which can abut the side surfaces 10A and 20A on both ends in the width direction W of the cases 10 and 20 of the first and the second battery devices 1, 2, an abutting wall 56 which can abut the lower surfaces 10C and 20C of the cases 10, 20, a back wall 58 provided at a depth corresponding to the length of the cases 10 and 20, and an upper wall 60 provided at a height corresponding to the thickness of the case 20 of the second battery device 2.

On the back wall 58, there are disposed housing chamber side terminals 62, which will be in contact with the battery side terminals 14 and 24 when the first battery device 1 or the second battery devices 2 is aligned parallel to a length direction L and inserted from the insert/take-out opening 52 to the depth direction.

At positions of the back wall 58 with spacing in between in the width direction, the engaging raised parts 64, 66 are formed so as to protrude towards the insert/take-out opening 52.

The engaging raised parts 64 and 66 are so constructed as to hold the lower surface 10C of the case 10 of the first battery device 1 in a condition of abutting the lower surface 10C to the abutting wall 56 by engaging a front edge of the upper surface 10B of the case 10 of the first battery device 1, and to hold the lower surface 20C of the case 20 of the second battery device 2 in a condition of abutting the lower surface 20C to the abutting wall 56 by engaging the engaging recessed parts 26 and 28 of the case 20 of the second battery device 2.

More specifically, the apparatus is so constructed that the first battery device 1 is held in a condition of abutting the first battery device 1 to the abutting wall 56 by engaging the lower surfaces 64A and 66A, in which each engaging raised part 64 and 66 faces the abutting wall 56, with the front edge of the upper surface 10B of the case 10 of the first battery device 1, and that the second battery device 2 is held in a condition of abutting the second battery device 2 to the abutting wall 56 by engaging the lower surfaces 64A and 66A of the engaging raised parts 64 and 66 with the flat surfaces 2602 and 2802 of the engaging recessed parts 26 and 28 of the case 20 of the second battery device 2.

Further, the apparatus is constructed such that a holding member 68 is disposed on an upper wall 60 part constituting the insert/take-out opening 52, and that an engaging part 6802 of a tip of the holding member 68 engages upper edges of rear surfaces 10E and 20E of both cases 10 and 20 of the first battery device 1 and the second battery device 2, forcing the first battery device 1 and the second battery device 2 housed in the battery housing chamber in a direction to the back wall 58, so as to hold the battery side terminals 14 and 24 in a condition of contacting with the housing chamber side terminals 62. In the present embodiment, the holding member 68 is formed with a resilient member having flexibility such that during inserting or taking out of the battery device, the holding member 68 may be lifted with a finger.

Further, as a structure of forcing the first and the second battery devices 1, 2 in the direction of the back wall 58 and holding the battery side terminals 14 and 24 in a condition of contacting with the housing chamber side terminals 62, various structures are known, and such a structure may be disposed on the housing side as in the present embodiment or disposed on the opening/closing cover 5104.

Next, installing and taking out of the first and the second battery devices 1, 2 to/from the battery housing chamber 50 will be described.

When installing the first battery device 1 in the battery housing chamber 50, as shown in FIG. SA, the engaging part 6802 of the holding member 68 is moved by a finger from the insert/take-out opening 52 upward, the battery side terminal 14 of the first battery device 1 is made to face the insert/take-out opening 52 of the battery housing chamber 50, and its length direction L is made to parallel to the depth direction of the battery housing chamber 50 to insert. This enables the lower surface 10C of the first battery device 1 to be guided to the abutting wall 56 of the battery housing chamber 50 and both side surfaces 10A of the first battery device 1 to be guided to both side walls 54 of the battery housing chamber 50, thereby initiating the insertion into the battery housing chamber 50.

When the finger is removed from the holding member 68, the engaging part 6802 is placed in a condition of contacting with the upper surface 10B of the first battery device 1. Further insertion of the first battery device 1 causes the two engaging raised parts 64 and 66 of the battery housing chamber 50 to be engaged at a place close to the front surface 10D of the upper surface 10B of the first battery device 1, the lower surface 10C of the case 10 of the first battery device 1 being held in a condition of abutting the abutting wall 56.

Further insertion of the first battery device 1 causes the battery side terminal 14 to contact the housing chamber side terminal 62, and in this condition the engaging part 6802 of the holding member 68 engages a rear edge of the upper surface 10B, while the battery side terminal 14 is held in a condition of contacting with the housing chamber side terminal 62, the first battery device 1 being housed in the battery housing chamber 50.

On the other hand, when taking out the first battery device 1 from the battery housing chamber 50, the engaging part 6802 of the holding member 68 is moved by a finger from the insert/take-out opening 52 upward, and by holding the first battery device 1 by the fingers and taking it out towards the rear, the first battery device 1 is taken out from the battery housing chamber 50.

When installing the second battery device 2 in the battery housing chamber 50, as shown in FIG. 5B, the engaging part 6802 of the holding member 68 is moved from the insert/take-out opening 52 upward, the battery side terminal 24 of the second battery device 2 is made to face the insert/take-out opening 52 of the battery housing chamber 50, and its length direction L is made to parallel to the depth direction of the battery housing chamber 50 to insert. This enables the lower surface 20C of the second battery device 2 to be guided to the abutting wall 56 of the battery housing chamber 50, the upper surface 20B of the second battery device 2 to be guided to the upper wall 60 of the battery housing chamber 50, and both side walls 20A of the first battery device 2 to be guided to both side walls 54 of battery housing chamber 50, thereby initiating the insertion into the battery housing chamber 50.

When the finger is removed from the holding member 68, the engaging part 6802 is placed in a condition of contacting with the upper surface 20B of the second battery device 2 and further insertion of the second battery device 2 causes lower surfaces 64A and 66A of two engaging raised parts 64 and 66 of the battery housing chamber 50 to engage flat surfaces 2602 and 2802 of each engaging recessed part 26 and 28 of the second battery device 2, so that the lower surface 20C of the case 20 of the second battery device 2 is held in a condition of abutting the abutting wall 56.

Further insertion of the second battery device 2 causes the battery side terminal 24 to contact the housing chamber side terminal 62, and in this condition the engaging part 6802 of the holding member 68 engages a rear edge of the upper surface 20B, while the battery side terminal 14 is held in a condition of contacting with the housing chamber side terminal 62, the second battery device 2 being housed in the battery housing chamber 50.

On the other hand, when taking out the second battery device 2 from the battery housing chamber 50, the engaging part 6802 of the holding member 68 is moved by the finger from the insert/take-out opening 52 upward, and by holding the second battery device 2 with the fingers and taking it out towards the rear, the second battery device 2 is taken out from the battery housing chamber 50.

Consequently, according to the present embodiment, it is possible to house selectively two types of the first and the second battery devices 1, 2 having different thicknesses in the same battery housing chamber 50. For example, corresponding to different uses and different purposes, it is possible to use battery devices of various capacities, making it advantageous in terms of the ease of use.

Further, in the present embodiment, since a plurality (two) of the engaging raised parts 64 and 66 and the engaging recessed parts 24 and 26 are disposed with a spacing in the width direction W, it is advantageous in stabilizing the inserted first and the second battery devices 1, 2 in the battery housing chamber 50.

Further, in the present embodiment, since the upper wall 60 which can abut the upper surface 20B of the second battery device 2 is disposed in the battery housing chamber 50, it is advantageous in stabilizing the inserted second battery device 2 in the battery housing chamber 50.

Next, an embodiment 2 will be described.

The embodiment 2 is different from the embodiment 1 in that a holding member 78 is slidably disposed in the up-and-down direction.

Figure 6:
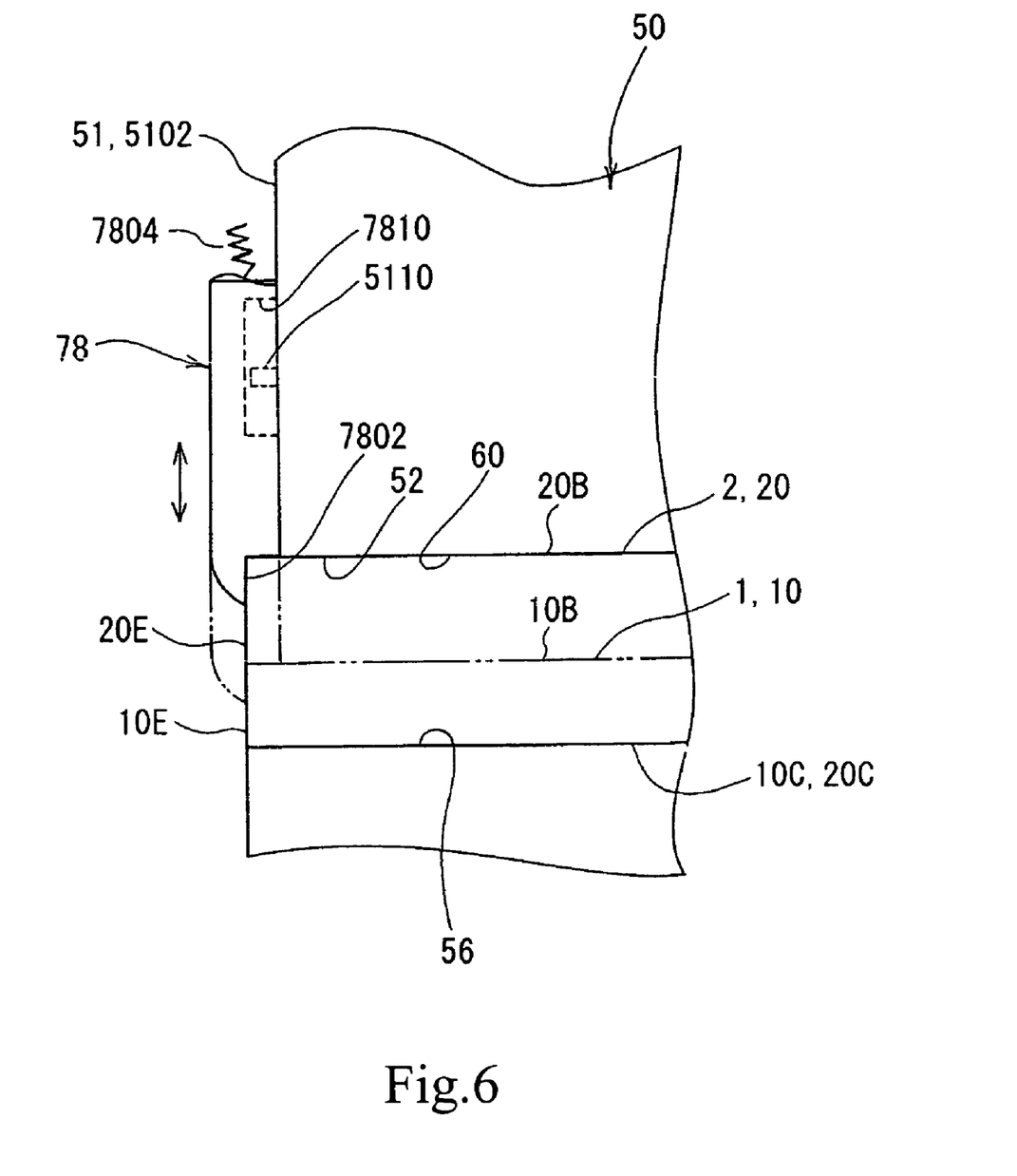
FIG. 6 is an explanatory diagram showing a construction of a battery housing chamber in an embodiment 2.

FIG. 6 is an explanatory diagram to show construction of a battery housing chamber in the embodiment 2.

As FIG. 6 shows, the holding member 78 extends linearly in the up-and-down direction, with an engaging recessed part 7802 engaging the rear surfaces 10E and 20E of the cases 10 and 20 disposed on its lower end.

The holding member 78 is slidably disposed in the up-and-down direction as a pin 5110 disposed so as to protrude from the casing 5102 engages a guide groove 7810 which is provided at the holding member 78, while the engaging recessed part 7802 at the lower end is being forced at all times by a forcing member 7804 towards the direction of the abutting wall 56, so that by moving the holding member 78 upward by the finger, the engaging recessed part 7802 can retreat from the insert/take-out opening 52.

Consequently, when inserting or taking out the first battery device 1 and the second battery device 2, in the same way as the embodiment 1, the holding member 78 is retreated by the finger from the insert/take-out opening 52.

Further, as shown in alternate lines of long and two short dashes in FIG. 6, when the first battery device 1 is inserted into the battery housing chamber 50, the engaging recessed part 7802 of the holding member 78 engages the upper edge of the upper surface 10B of the case 10 of the first battery device 1, thus holding a condition in which the battery side terminal 14 of the first battery device 1 is in contact with the housing chamber side terminal 62.

Further, as shown in solid lines in FIG. 6, when the second battery device 2 is inserted into the battery housing chamber 50, the engaging recessed part 7802 of the holding member 78 engages the upper edge of the upper surface 20B of the case 20 of the second battery device 2, thus holding a condition in which the battery side terminal 24 of the second battery device 2 is in contact with the housing chamber side terminal 62.

Accordingly, in the embodiment 2, similar advantages as in the embodiment 1 are naturally produced.

Next, attachment of the film 202 will be described.

In the present embodiment, as shown in FIG. 2A and FIG. 2B, when the first and the second battery devices 1, 2 are viewed from the side, between the front cap 102 and the upper edge of each side wall 106, there is formed a height difference respectively with the front cap 102 being high and the upper edge of each side wall 106 being low, and between the rear part 104 and the upper edge of each side wall 106, there is formed a height difference D respectively with the rear part 104 being high and the upper edge of each side wail 106 being low.

Figure 7A:
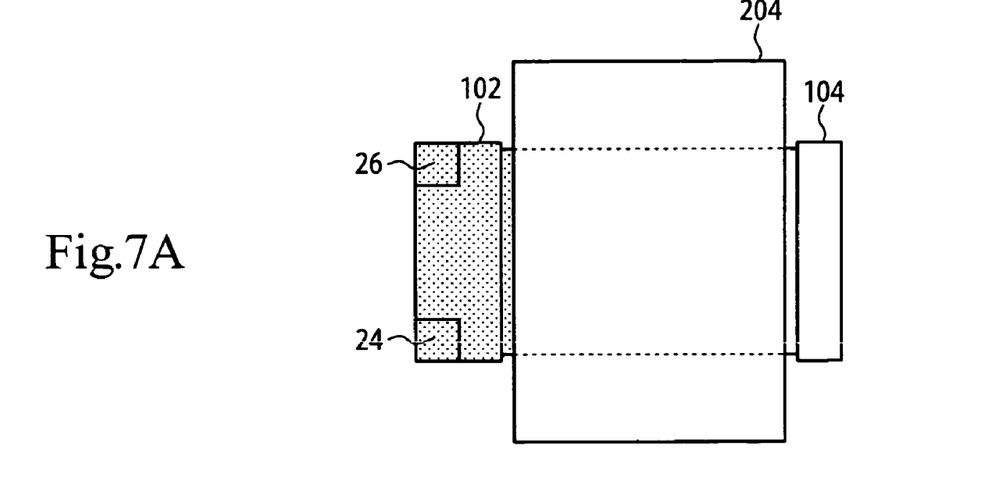
FIG. 7A to FIG. 7C are explanatory diagrams showing a condition of generation of crease when attaching a film.
Figure 7B:
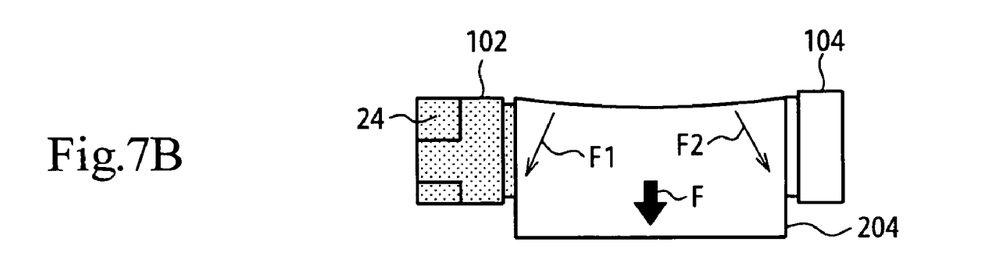
Figure 7C:
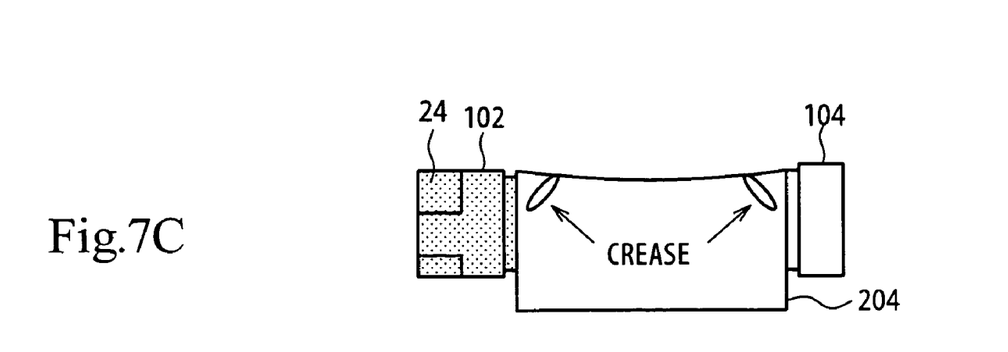

As mentioned above, having these four height differences D, as shown in FIG. 7A and FIG. 7B, the upper film 204 is attached to cover the front cap 102, the rear part 104, and the two side walls 106 between part close to the front surface 10D or 20D and part close to the rear surfaces 10E or 20E. When applying a downward tensile force (in the direction of arrow F) to both sides of the width direction of the upper film 204, as shown in FIG. 7C, stresses F1 and F2 generate in concentration on portions abutted by each height difference D, thus causing creases to be generated on the upper film 204, thereby preventing from spoiling appearance of the apparatus.

Figure 8A:
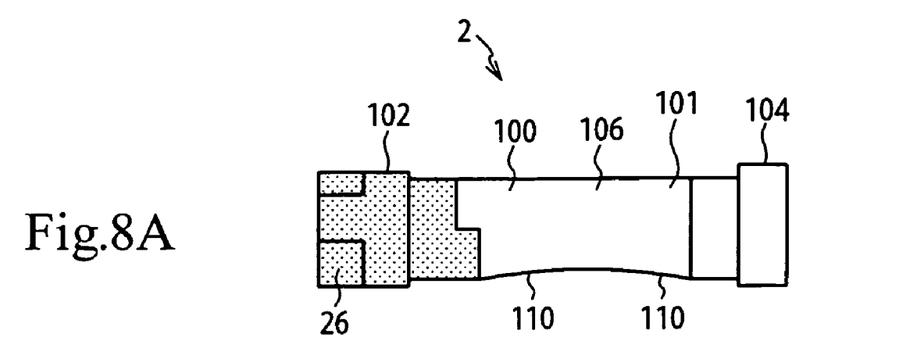
FIG. 8A and FIG. 8B are explanatory diagrams showing a construction with a slant part disposed on a frame of the battery device.
Figure 8B:
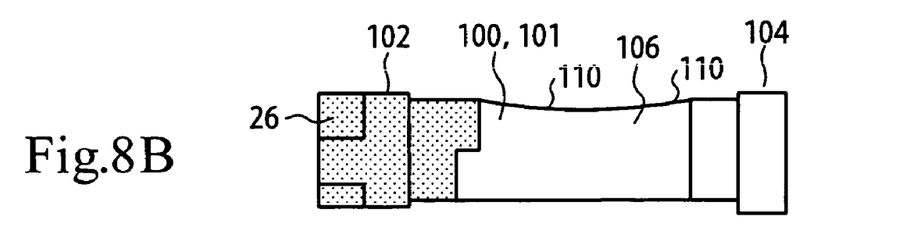

In order to prevent from such generation of creases, as shown in FIG. 8A and FIG. 8B, a slant part 108 protruding upward to eliminate the height difference D is disposed on the upper edge portion of the side wall 106 facing the front cap 102 while, at the same time, slant parts 110 protruding upward to eliminate the height difference D are disposed on an upper edge portion of the side wall 106 facing the rear part 104. In other words, the slant parts 110 are formed in such a way that the slant parts 110 start to form from a middle portion of the length direction of the frame 100 to the front cap 102 or the rear part 104, the amount of protrusion from the frame 100 gradually increase so as to make continuous connection to the front cap 102 or the rear part 104.

Figure 9A:
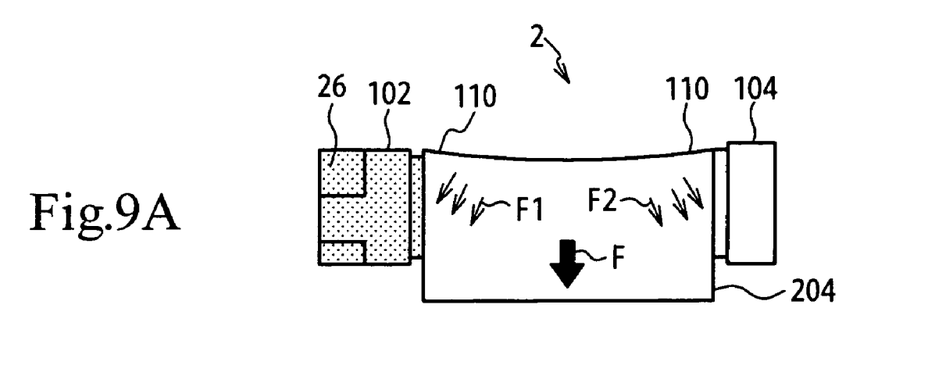
FIG. 9A and FIG. 9B are explanatory diagrams showing a condition for preventing from generation of creases when attaching a film.
Figure 9B:
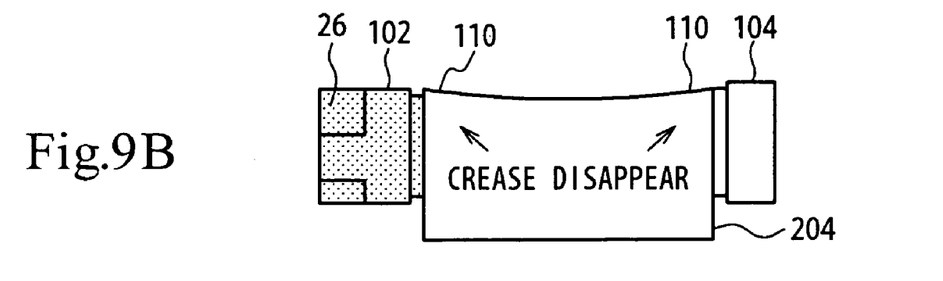

According to such construction, as shown in FIG. 9A and FIG. 9B, the upper film 204 is attached to the front cap 102, the rear part 104, and the two side walls 106 between the portions close to the front surfaces 10D and 20D and the portions close to the rear surfaces 10E and 20E, so that even if the downward tensile force (in the direction of arrow F) is applied to both sides of the width direction of the upper film 204, since the upper film abuts each slant part 110, the stresses F1 and F2 generated at the abutted portions disperse, thereby preventing from generating the creases in the upper film 204 and making it possible to improve external appearance of the apparatus.

INDUSTRIAL APPLICABILITY

According to the battery device of the present invention, by using the engaging recessed part, it is possible to selectively house the first or the second battery device of different thicknesses in the same battery housing chamber, and allows to use battery devices having various capacities for different uses and different purposes and improve the ease of use.

The invention claimed is:

1. A battery device housed in a single battery housing chamber of an electronic device, comprising:

a case having side surfaces located on both ends of a width direction, an upper surface and lower surface located on both ends of a thickness direction, and a front surface and a rear surface located on both ends of a length direction;

a charging unit fixed inside the case; and a battery side terminal disposed on the front surface of the case and connected to the charging unit, the battery side terminal configured to connect to a housing chamber side terminal of the electronic device to provide electric power to the charging unit from the electronic device as said charging unit charges and to provide electric power from the charging unit to the electronic device through the battery side terminal as the charging unit discharges, wherein a first engaging recessed part is formed on the front surface of the case of the battery device and a second engaging recessed part is formed on the front surface of the case of the battery device, the first and second engaging recessed parts being separated in the width direction by a gap.

2. The battery device according to claim 1, wherein the battery device comprises a frame and a film attached to portions of the frame excluding a front and back side portions of the frame.

3. The battery device according to claim 2, wherein the film is attached to the frame so as to wrap around the entire circumference excluding the front and back side portions of the frame; and the battery device further includes slant parts disposed on side surfaces of the frame, which correspond to the side surfaces of the case, each of the slant parts facing toward the front or back side of the frame, an amount of protrusion from the frame being increased starting from the middle position in the length direction of the frame to the front or back side portion of the frame, the slant part making continuous connection to the front and back side portion.

4. The battery device according to claim 1, wherein the first recessed engaging part is also formed on a first side surface of the case.

5. The battery device according to claim 4, wherein the second recessed engaging part is also formed on a second side surface of the case.

6. The battery device according to claim 5, wherein the first recessed engaging part is formed above the battery side terminal.

7. The battery device according to claim 1, wherein the second recessed engaging part is also formed on a second side surface of the case.

8. The battery device according to claim 7, wherein the first recessed engaging part is formed above the battery side terminal.

9. The battery device according to claim 1, wherein the first recessed engaging part is formed above the battery side terminal.

10. A battery device housed in a single battery housing chamber of an electronic device, comprising:

a case having side surfaces located on both ends of a width direction, an upper surface and lower surface located on both ends of a thickness direction, and a front surface and a rear surface located on both ends of a length direction;

a charging unit fixed inside the case; and a battery side terminal disposed on the front surface of the case and connected to the charging unit, the battery side terminal configured to connect to a housing chamber side terminal of the electronic device to provide electric power to the charging unit from the electronic device as said charging unit charges and to provide electric power from the charging unit to the electronic device through the battery side terminal as the charging unit discharges, wherein first engaging means are formed on the front surface of the case of the battery device and second engaging means are formed on the front surface of the case of the battery device, the first and second engaging means being separated in the width direction by a gap.

11. The battery device according to claim 10, wherein the battery device comprises a frame and a film attached to portions of the frame excluding a front and back side portions of the frame.

12. The battery device according to claim 11, wherein the film is attached to the frame so as to wrap around the entire circumference excluding the front and back side portions of the frame; and the battery device further includes slant parts disposed on side surfaces of the frame, which correspond to the side surfaces of the case, each of the slant parts facing toward the front or back side of the frame, an amount of protrusion from the frame being increased starting from the middle position in the length direction of the frame to the front or back side portion of the frame, the slant part making continuous connection to the front and back side portion.

13. The battery device according to claim 10, wherein the first engaging means extends to a first side surface of the case.

14. The battery device according to claim 13, wherein the second engaging means extends to a second side surface of the case.

15. The battery device according to claim 14, wherein the first engaging means is formed above the battery side terminal.

16. The battery device according to claim 10, wherein the second engaging means extends to a second side surface of the case.

17. The battery device according to claim 16, wherein the first engaging means is formed above the battery side terminal.

18. The battery device according to claim 10, wherein the first engaging means is formed above the battery side terminal.

19. The battery device according to claim 10, wherein the first engaging means and the second engaging means are both open to the front surface, the upper surface, and a corresponding side surface.

20. The battery device according to claim 10, wherein the first engaging means and the second engaging means are both include a flat surface parallel to both the upper surface and the lower surface.

21. The battery device according to claim 1, wherein the first engaging recessed part and the second engaging recessed part are both open to the front surface, the upper surface, and a corresponding side surface.

22. The battery device according to claim 1, wherein the first engaging recessed part and the second engaging recessed part are both include a flat surface parallel to both the upper surface and the lower surface.

* * * * *